United States Patent
Kastler et al.

(10) Patent No.: US 12,330,294 B2
(45) Date of Patent: Jun. 17, 2025

(54) DRIVEN LINEAR AXIS AND INDUSTRIAL ROBOT

(71) Applicant: Beckhoff Automation GmbH, Verl (DE)

(72) Inventors: Peter Kastler, Vienna (AT); Clemens Maier, Bludenz (AT); Thomas Morscher, Vienna (AT); Armin Pehlivan, Nüziders (AT); Christoph Zech, Mödling (AT)

(73) Assignee: Beckhoff Automation GmbH, Verl (DE)

( * ) Notice: Subject to any disclaimer, the term of this patent is extended or adjusted under 35 U.S.C. 154(b) by 213 days.

(21) Appl. No.: 18/065,333

(22) Filed: Dec. 13, 2022

(65) Prior Publication Data

US 2023/0111836 A1     Apr. 13, 2023

Related U.S. Application Data

(63) Continuation of application No. PCT/EP2021/070435, filed on Jul. 21, 2021.

(30) Foreign Application Priority Data

Jul. 23, 2020  (DE) .................... 10 2020 119 499.4

(51) Int. Cl.
*B25J 19/00* (2006.01)
*B25J 9/10* (2006.01)
*B25J 9/12* (2006.01)

(52) U.S. Cl.
CPC ........... *B25J 19/0025* (2013.01); *B25J 9/102* (2013.01); *B25J 9/104* (2013.01); *B25J 9/126* (2013.01)

(58) Field of Classification Search
CPC . B25J 5/02; B25J 19/0025; B25J 9/102; B25J 9/104; B25J 9/126
(Continued)

(56) References Cited

U.S. PATENT DOCUMENTS

| | | |
|---|---|---|
| 4,655,442 A | 4/1987 | Laukenmann et al. |
| 5,069,524 A | 12/1991 | Watanabe et al. |

(Continued)

FOREIGN PATENT DOCUMENTS

| | | |
|---|---|---|
| CN | 101047329 A | 10/2007 |
| CN | 103343804 A | 10/2013 |

(Continued)

OTHER PUBLICATIONS

International Preliminary Report on Patentability dated Jan. 24, 2023 in connection with International Patent Application No. PCT/EP2021/070435, 11 pages including English translation.

(Continued)

*Primary Examiner* — T. Scott Fix
(74) *Attorney, Agent, or Firm* — Dorsey & Whitney LLP (57) ABSTRACT

A driven linear axis includes a housing which has a linear rail guide on which a carriage is arranged such that it can be moved back and forth linearly with the aid of a transport device. The transport device comprises a belt which circulates in the housing and is guided over two gears, at least one gear being configured as a drive gear. Furthermore, a drive device is arranged within the drive gear and is in a torque-locking rotary connection with the drive gear.

14 Claims, 6 Drawing Sheets

(58) Field of Classification Search
USPC .................................................. 74/490.02
See application file for complete search history.

(56) References Cited

U.S. PATENT DOCUMENTS

| | | | |
|---|---|---|---|
| 5,234,386 A | 8/1993 | Nagai et al. | |
| 5,460,536 A | 10/1995 | Cullen | |
| 5,799,543 A | 9/1998 | Nagai et al. | |
| 6,084,373 A | 7/2000 | Goldenberg et al. | |
| 7,922,613 B2 | 4/2011 | Ida | |
| 10,016,890 B2 | 7/2018 | Ochiishi et al. | |
| 2003/0172755 A1* | 9/2003 | Nagai | F16C 29/02 74/89.2 |
| 2005/0072261 A1 | 4/2005 | Okada et al. | |
| 2009/0322041 A1* | 12/2009 | Norton | B25J 15/04 29/428 |
| 2013/0340560 A1 | 12/2013 | Burridge et al. | |
| 2015/0231781 A1 | 8/2015 | Ochiishi et al. | |

FOREIGN PATENT DOCUMENTS

| | | | | |
|---|---|---|---|---|
| CN | 203319164 U | | 12/2013 | |
| CN | 104842339 A | * | 8/2015 | .......... B25J 19/0025 |
| DE | 3427949 A1 | | 9/1985 | |
| DE | 69211472 T2 | | 7/1996 | |
| DE | 4397555 T1 | | 7/1997 | |
| DE | 102007013446 A1 | | 10/2007 | |
| DE | 102013211301 A1 | | 12/2014 | |
| DE | 102015001865 A1 | | 8/2015 | |
| EP | 2848378 A1 | | 3/2015 | |
| JP | H0294816 U | | 7/1990 | |
| WO | WO-2006045205 A1 | * | 5/2006 | ............. B21D 43/05 |

OTHER PUBLICATIONS

International Search Report and Written Opinion dated Dec. 3, 2021 in connection with International Patent Application No. PCT/EP2021/070435, 17 pages including English translation.

Office Action dated Aug. 30, 2023 in connection with Chinese patent application No. 202180047662.2, 16 pages including English translation.

English Translation of Ochiishi et al. CN 104842339 A (obtained from Espacenet Sep. 26, 2024).

* cited by examiner

DRIVEN LINEAR AXIS AND INDUSTRIAL ROBOT

CROSS-REFERENCE TO RELATED APPLICATIONS

The present application is continuation of International Patent Application No. PCT/EP2021/070435, filed Jul. 21, 2021, DRIVEN LINEAR AXLE AND INDUSTRIAL ROBOT, which claims priority to German patent application DE 20 2010 119 499.4, filed Jul. 23, 2020, ANGETRIE-BENE LINEARACHSE SOWIE INDUSTRIEROBOTER, each of which is incorporated by reference herein, in the entirety and for all purposes.

FIELD

The present invention relates to a driven linear axis as a robot base for a robot arm of an industrial robot. Furthermore, the invention relates to an industrial robot.

BACKGROUND

Linear axes are used in large quantities in automation technology and usually have a carriage that may be driven by a toothed belt. An external electric motor is used to drive the toothed belt of the linear axis, which is usually coupled to the toothed belt via a gear device in a step-down manner. The problem here is that the drive, i.e. the electric motor or the gearbox, protrudes from the axis and is comparatively large.

This is particularly disadvantageous if the driven linear axis is to be used as a robot base for an industrial robot. By adding a driven linear axis as a robot base, the industrial robot may additionally perform linear movements. In order to optimally integrate the driven linear axis into the industrial robot, all the media required by the industrial robot are also available at the carriage of the linear axis.

SUMMARY

The present invention provides a driven linear axis as a robot base for an industrial robot and a corresponding industrial robot, which have a simple design and only require a small space.

According to one aspect, a driven linear axis comprises a housing having a linear rail guide with two profile rails on which a carriage is arranged so as to be linearly movable back and forth with the aid of a transport device. The carriage has a guide body with two lateral track carriages and a multifunctional interface. The carriage is guided between the two profile rails with the aid of the two lateral carriages. The transport device comprises a belt which circulates in the housing and is guided over two gears, at least one gear being embodied as a drive gear. A drive device is set up inside the drive gear in the form of a drive cartridge and is in a torque-locking rotational connection with the drive gear.

According to another aspect, an industrial robot has a robot arm and a robot base. The robot base comprises a housing having a linear rail guide with two profile rails on which a carriage is arranged so as to be linearly movable back and forth with the aid of a transport device. The carriage has a guide body with two lateral track carriages and a multifunctional interface. The carriage is guided between the two profile rails with the aid of the two lateral carriages. The multifunctional interface of the carriage comprises a connection side comprising a mechanical interface and a media interface. At least one reciprocable media drag guides a media path to the media interface within the housing. A connection side of the robot arm is constructed complementary to the connection side of the carriage, wherein the robot arm is mechanically connected to the carriage of the driven linear axis and is signal-technically, electrically and/or fluidically connected to the carriage of the driven linear axis.

EXAMPLES

The driven linear axis comprises a housing which has a linear rail guide on which a carriage is arranged so that it may be moved back and forth linearly with the aid of a transport device. The transport device comprises a belt which circulates in the housing and is guided over two gears, at least one gear being embodied as a drive gear. A drive device is arranged inside the drive gear and is in a torque-locking rotary connection with the drive gear.

The drive device is integrated into the linear axis and essentially requires no additional external installation space. The drive device of the linear axis is arranged completely within the drive gear for the transport device. In this context, the drive device has the drive gear rotating fully around its circumference, the drive gear being seated on the drive device and being rotated by the drive device. The drive device forms a compact drive cartridge that may be replaced quickly and easily. This is particularly advantageous in the event of a defect in the drive device or if requirements for the drive device change, e.g. if a different transmission ratio is desired.

The driven linear axis may be used instead of all conventional standard linear axes. In addition, the linear axis lends itself as a robot base for a robot arm of an industrial robot in order to be able to perform additional linear movements.

The drive device may have a bearing axis via which the drive device is held in the linear axis. Furthermore, the drive device may have an electric motor device and a gear device coupled therewith in a torque-locking manner. The electric motor device and the gear device may be set up directly adjacent to one another in the drive device. Furthermore, the electric motor device and the gear device may be coupled via an output shaft of the electric motor device. In this case, the output shaft, starting from a rotor of the electric motor device, may be coupled in a torque-proof manner to an input side rotatably accommodated on the bearing axis. Furthermore, an output side of the gear device may be coupled to the drive gear in a torque-proof manner. This achieves a particularly compact design of the drive device.

The bearing axis may be set up in the linear axis in a torque-proof manner. Furthermore, the electric motor unit and the gear device may be mounted on the bearing axis. The drive gear may thereby be rotatably mounted on the bearing axis. At least one radial rolling bearing (roller bearing, ball bearing, needle bearing, etc.) or at least one radial plain bearing may be used for this purpose. Furthermore, the output side of the gear device may be supported on the bearing axis in an analogous manner. Furthermore, a stator of the electric motor device may preferably be supported on the hollow shaft via a radial rolling bearing (roller bearing, ball bearing, needle bearing, etc.) or also a radial plain bearing.

The carriage of the driven linear axis has a multifunctional interface, which comprises a mechanical interface and a media interface, wherein the media interface preferably comprises a data signal interface, an electrical interface and a fluidic interface. Thereby, at least one reciprocating media drag device having a media path is provided within the housing, preferably a data signal path to the data signal interface, an electrical path to the electrical interface, and a fluid path leading to the fluidic interface of the multifunctional interface of the carriage.

At least one medium (carrier for a propagation of a signal or a physical phenomenon; optical, electrical, fluidic), which is required on the carriage, in particular when used as a robot base for a robot arm of an industrial robot, is thereby guided via the media drag device mounted in the linear axis. The media feed-through thus takes place inside the linear axis and requires no additional space.

The multifunctional interface of the carriage comprises a mechanical interface, which in turn comprises the data signal interface, the electrical interface and the fluidic interface. The following more detailed description of the multifunctional interface may also apply to a multifunctional counter-interface corresponding to it. In this case, the two multifunctional interfaces, i.e. the interface and its corresponding counter-interface, may be positioned to face each other and are preferably complementary, i.e. partially complementary or essentially fully complementary, i.e. interface-complementary.

The multifunctional interface may be embodied as a carriage-fixed interface. In this case, the multifunctional interface is provided on a guide body of the carriage.

The mechanical interface of the multifunctional interface may be embodied as a pluggable, screwable, toothed, clampable and/or self-locking interface. The mechanical interface may furthermore comprise a stop and/or a toothing, in particular a toothing on the end face. If toothing is used, this may particularly be a Hirth toothing.

Furthermore, the mechanical interface may have a thread, in particular a radially outer, outer or inner circumferential thread. In this case, the thread or the circumferential thread may be embodied as a self-locking thread or circumferential thread. If a circumferential thread is used, this may particularly be a multi-start circumferential thread. Moreover, the mechanical interface may be embodied as an interface that may be contacted at least mechanically by a contacting device, in particular a contacting ring.

The data signal interface, the electrical interface and the fluidic interface may be set up radially within the mechanical interface. The data signal interface may hereby be provided on a central axis of the mechanical interface. Furthermore, the electrical interface and the fluidic interface may be provided radially outside of the data signal interface. Furthermore, the fluidic interface may at least in sections be provided radially outside of the electrical interface.

The multifunctional interface may comprise a connection side delimited by a circular shape. Here, the connection side may have the mechanical interface at its radial outer edge. Furthermore, the connection side may be embodied separately on the carriage or may be embodied at least partially by the carriage. Furthermore, the connection side may be embodied in one piece or in multiple pieces. In addition, the connection side may be embodied as a connection disk or a connection bushing.

Within the linear axis, a data signal path, an electrical path and/or a fluid path may be set up as a media path, which lead to the multifunctional interface of the carriage. Here, the relevant path may start at a respective external connection at the linear axis or the relevant path is led into the linear axis, e.g. in the form of conductors. With the aid of the at least one media drag device, a reciprocating data signal path, a reciprocating electrical path and/or a reciprocating fluid path may be guided to the multifunctional interface in a protected manner in the linear axis. Flexible optical, electrical, pneumatic and/or hydraulic conductors may be guided with the aid of the media drag device while maintaining, i.e. not falling below, a smallest permissible bending radius of the lines.

The industrial robot comprises a robot arm, in particular a modular robot arm, and the driven linear axis, wherein the robot arm is mechanically connected to the carriage of the driven linear axis and is optically, electrically and/or fluidically connected to the carriage of the driven linear axis.

The robot arm may have a plurality of arm modules. One arm module may be embodied as an active arm module with the aid of which a further arm module connected to it may be rotated. This further arm module may be embodied as an active or as a passive arm module. Furthermore, an arm module may be embodied as a passive arm module, which e.g. serves as an extension part and/or position change part within the robot arm.

The housing of the arm module preferably comprises a first connection side at the front and a second connection side offset from the connection side. The connection sides are preferably embodied to correspond to each other.

An arm module may be embodied in such a way that a data signal, an electric current or an electric voltage, and/or a fluid may be exchanged with the further arm module via its first connection side and/or via its second connection side, the first connection side being mechanically, signalwise, electrically and/or fluidically connected to the second connection side.

The first connection side and/or the second connection side may be set up in a torque-proof manner on the relevant arm module. In the case of an active arm module, the first connection side may be set up to rotate about an axis of rotation so that the first connection side may be controllably rotated about the axis of rotation relative to the connection side.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. shows 7 a three-dimensional top view from diagonally above of a connection side embodied as a connection disk for the carriage of the driven linear axis according to FIGS. 1 to 3.

DETAILED DESCRIPTION

The representation refers to an orthogonal coordinate system with a vertical direction Hr, a longitudinal direction Lr and a transverse direction Qr.

The invention is explained in more detail with reference to an embodiment of a driven linear axis which serves as the robot base of a robot arm, in particular a modular robot arm. However, the driven linear axis is not limited to this possible application.

Figure 1:
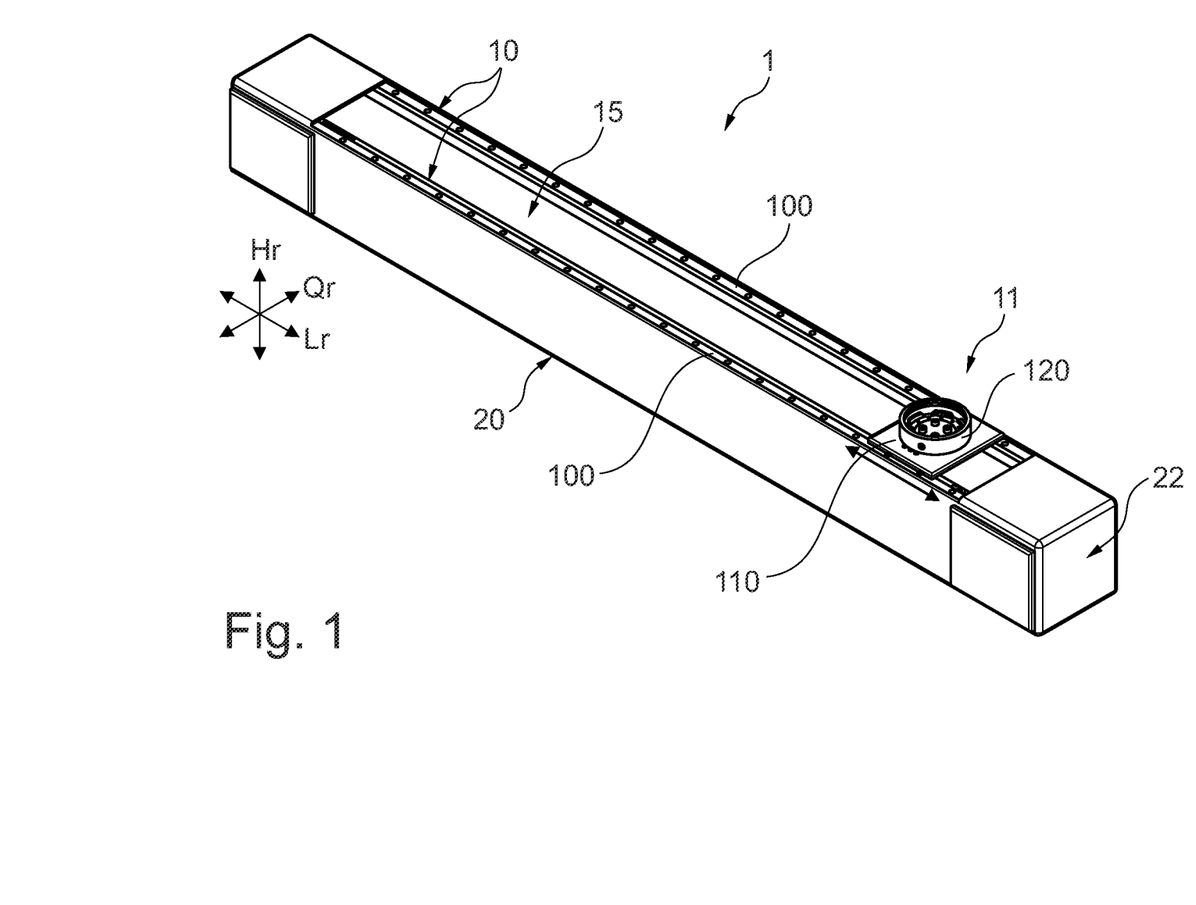
FIG. 1 shows in a perspective view from diagonally above, an embodiment of a driven linear axis.
Figure 2:
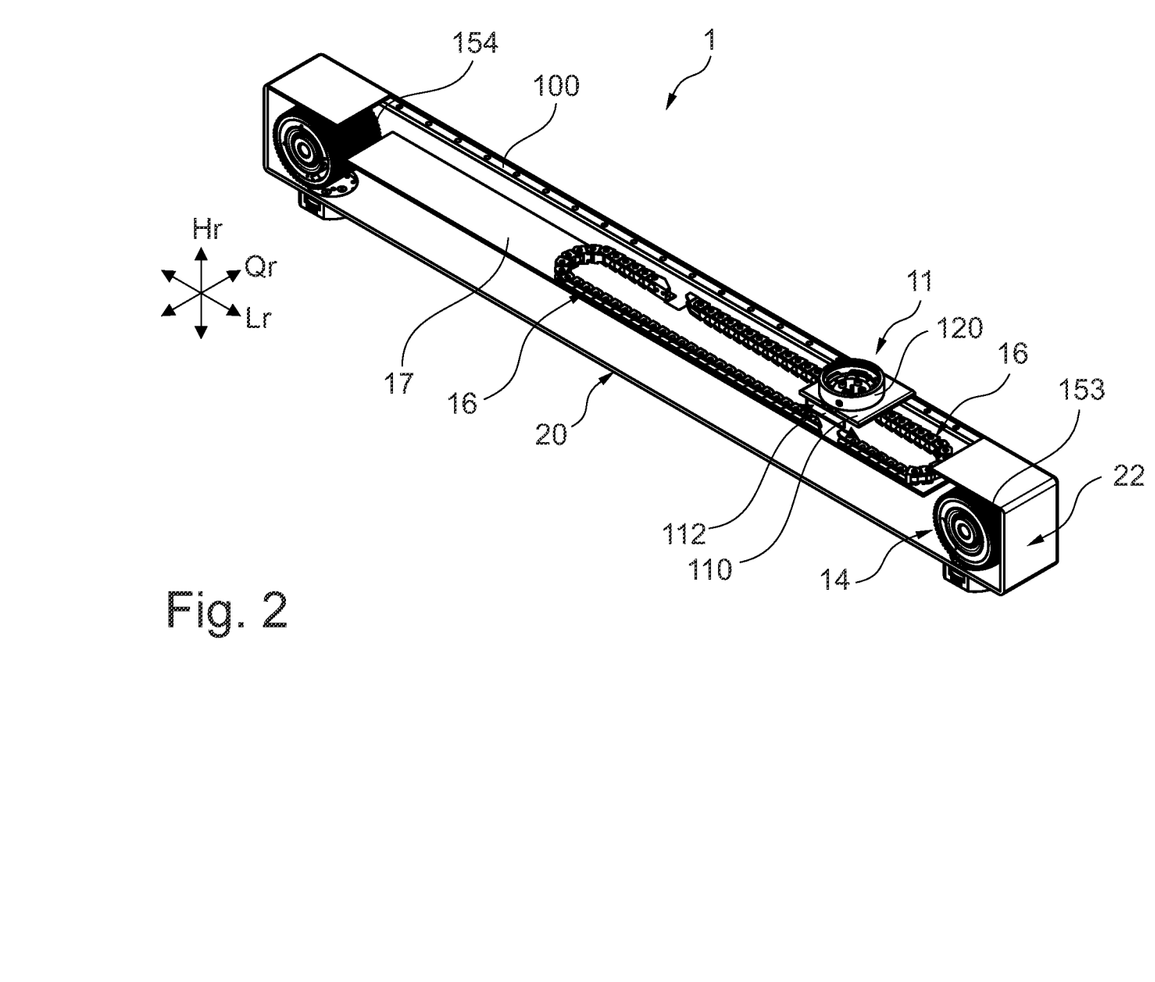
FIG. 2 shows the driven linear axis of FIG. 1 in a laterally open, three-dimensional view from diagonally above.

FIG. 1 shows the driven linear axis in a perspective view from diagonally above. FIG. 2 shows the perspective view of FIG. 1 in a laterally open representation to render details clear. Furthermore, FIG. 3 shows an end section of the driven linear axis in a centrally sectional view from the front and center.

As shown in FIG. 1, the driven linear axis 1 comprises an elongated housing 20 with a linear rail guide 10 on top of the housing 20, which comprises two profile rails 100. A linear reciprocating carriage 11 is provided between the profile rails 100 and includes a multifunctional interface 120.

Figure 3:
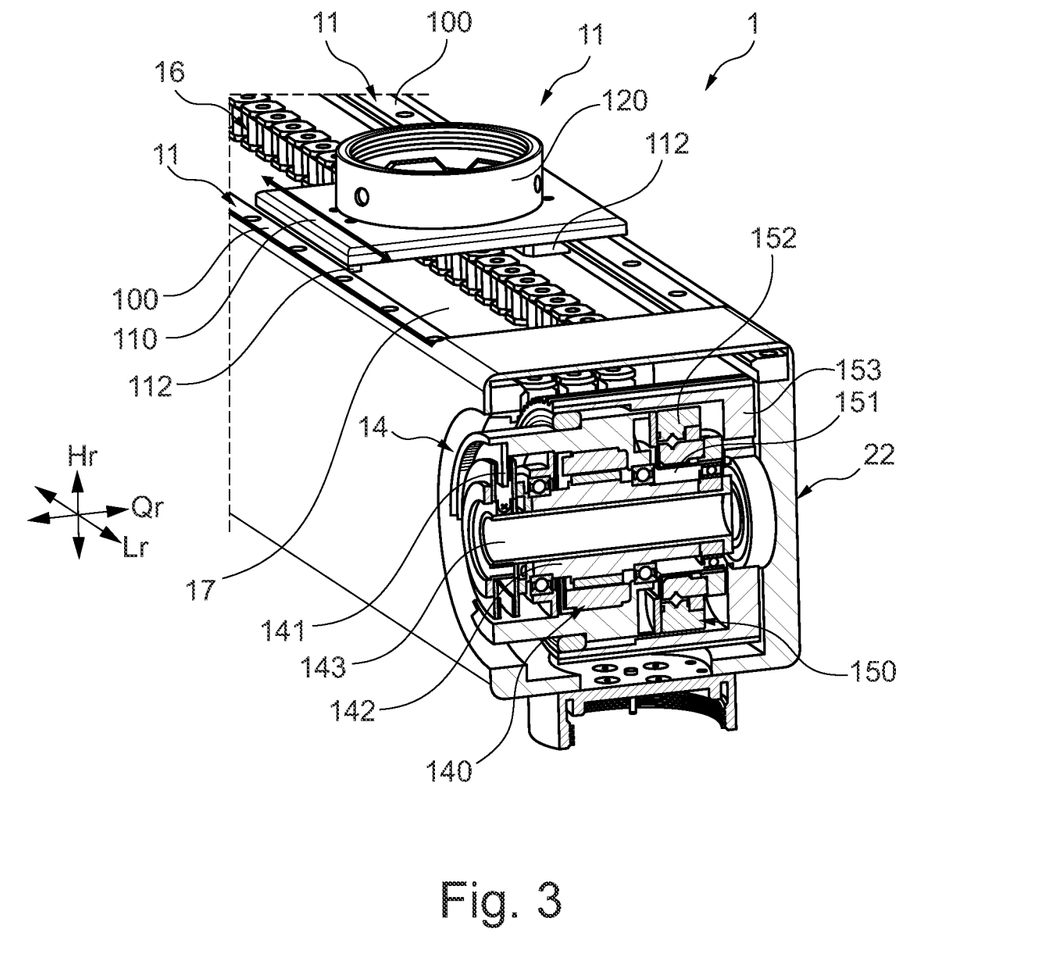
FIG. 3 shows a detailed view of the linear axis of FIG. 1, wherein the driven linear axis is shown in a centrally sectional view from the front and center in a region of an integrated drive device.

As shown in particular in FIG. 3, the carriage 11 comprises a guide body 110 with two lateral track carriages 112 on an underside, via which the carriage 11 is guided between the profile rails 100 in a straight line and in particular on a plain bearing. The track carriages 112 may also be integrated laterally in the guide body 110. The guide body 110 and the track carriages 112 may be embodied in multiple parts. Alternatively, the guide body 110 and the lateral track carriages 112 may be in one-piece or of integral material embodiment.

The carriage 11 comprises two substantial translational degrees of freedom in the longitudinal direction Lr. As shown in FIG. 3, each profile rail 100 internally comprises a form-fit profile profiled in the transverse direction Qr, to which the respective track carriage 110 is arranged on a complementary form-fit profile.

The carriage 11 may be moved by a transport device, which in this case is an elongated, approximately 0-shaped belt, preferably a toothed belt 15. The toothed belt 15 is an elongated circulating belt with a toothing, of which the upper layer is shown in FIG. 1. Instead of the toothed belt 15, another type of belt may be used, as well.

The toothed belt 15 is guided over two toothed gears 153, 154, which are shown in FIG. 2. One gear is embodied as a drive gear 153 and the other gear as a running gear 154. Alternatively, both gears may also be drive gears. The drive gear 153 is in a torque-locked, in particular a fixed rotary connection, with a drive device 14 of the driven linear axis 1. The drive device 14 and the drive gear 153 are thereby set up in a drive housing section 22 of the housing 20 of the linear axis 1, which in particular forms a corresponding longitudinal end section of the housing 20.

As FIG. 3 illustrates, the toothed belt 15 is seated on the drive gear 153 with a loop. The drive gear 153 has an external toothing which corresponds to a complementary internal toothing of the toothed belt 15.

Furthermore, as FIG. 2 shows, the driven linear axis 1 comprises at least one reciprocating media drag device, which in the embodiment shown consists of two drag chains 16. The media drag device may also comprise only one drag chain or even further drag chains. The two drag chains 16 are set up between the upper and lower positions of the toothed belt 15 in the housing 20 of the linear axis 1. Here, the drag chains 16 rest on a plate-shaped device 17, which is attached laterally on the inside of the housing 20. With the aid of the two drag chains 16, media paths such as a data signal path, an electrical path and a fluid path are set up in the linear axis 1 so that they may be moved back and forth and may be guided to the multifunctional interface 120 in a protected manner. The drag chains 16 are set up in such a way that a minimum bending radius of a certain embodiment of the media path is not undercut.

The two drag chains 16 are curved in opposite directions to each other and are arranged opposite to each other in the longitudinal direction Lr on the plate-shaped device 17. Preferably on a transverse side, in particular mainly or substantially centrally in the longitudinal direction Lr, the respective path leads into the respective drag chain 16 via a recess in the plate-shaped device 17. Starting therefrom, the respective drag chain 16 initially leads in the direction of a longitudinal end of the linear axis 1 up to a region in which it curves to the opposite transverse side and leads back in the direction of the carriage 11. Below the carriage 11, the media paths of the drag chains 16 lead to the multifunctional interface 120 of the carriage 11.

Figure 6:
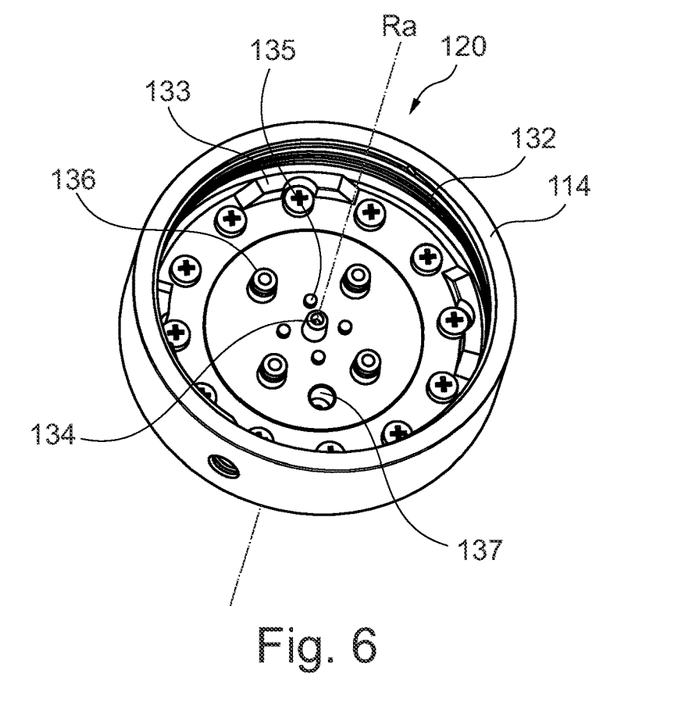
FIG. 6 shows a three-dimensional top view from diagonally above of a connection side embodied as a connection socket for a carriage of the driven linear axis according to FIGS. 1 to 3.
Figure 7:
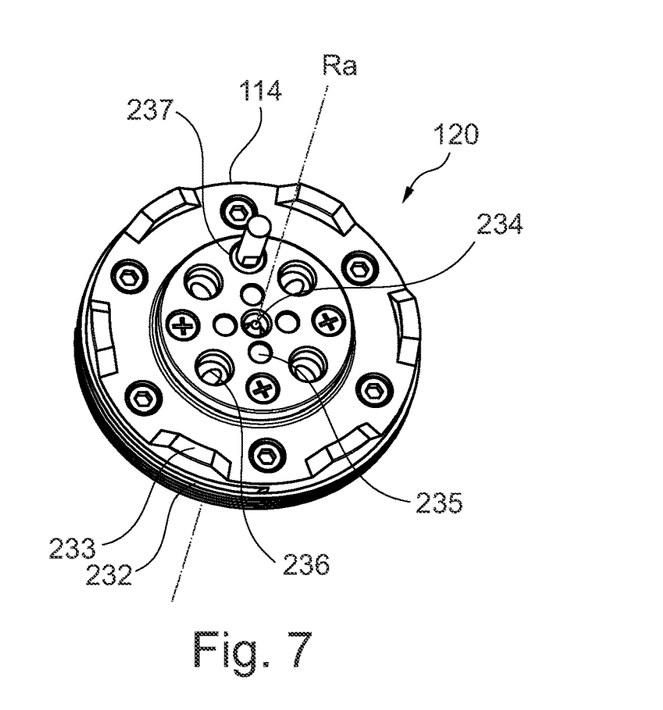

The multifunctional interface 120 of the carriage 11 has a connection side 114. As shown in FIG. 3 and FIG. 6, the connection side 114 may be embodied as a connection socket for a connection disk. Alternatively, the connection side 114, as shown in FIG. 7, may be embodied as a connection disk for a connection socket. However, the connection side may have any contact mimic. The connection side 114 of the multifunctional interface 120 is thereby basically designed in such a way that the connection side 114 of the multifunctional interface 120 corresponds to and may be connected to a connection end side of a recipient for the media, which are guided to the multifunctional interface 120 of the carriage 11 via the media paths in the drag chains 16.

Figure 4:
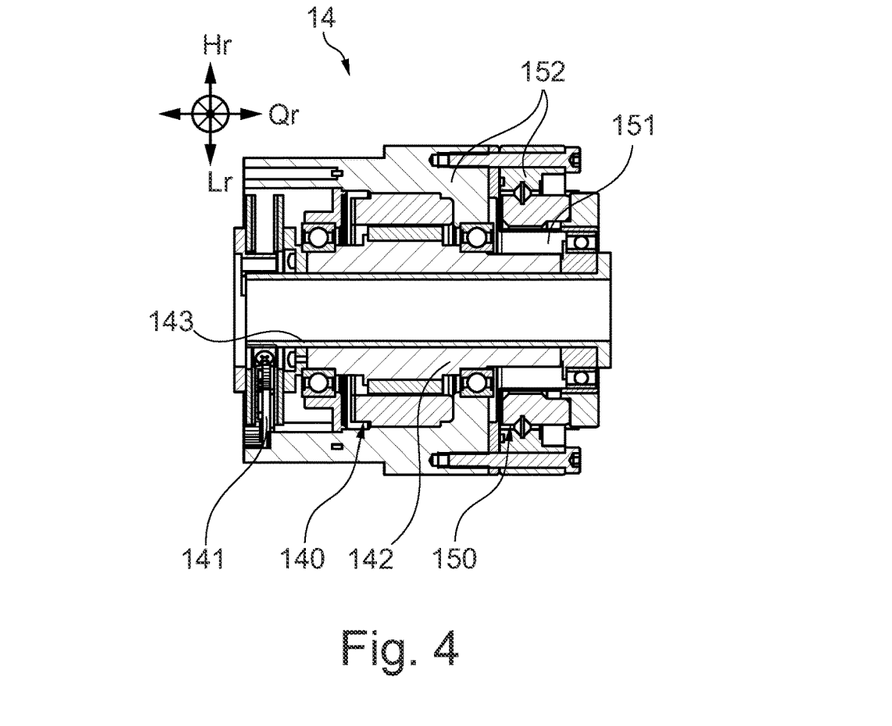
FIG. 4 shows a centrally sectional two-dimensional side view, an embodiment of a drive device for the driven linear axis according to FIGS. 1 to 3.
Figure 5:
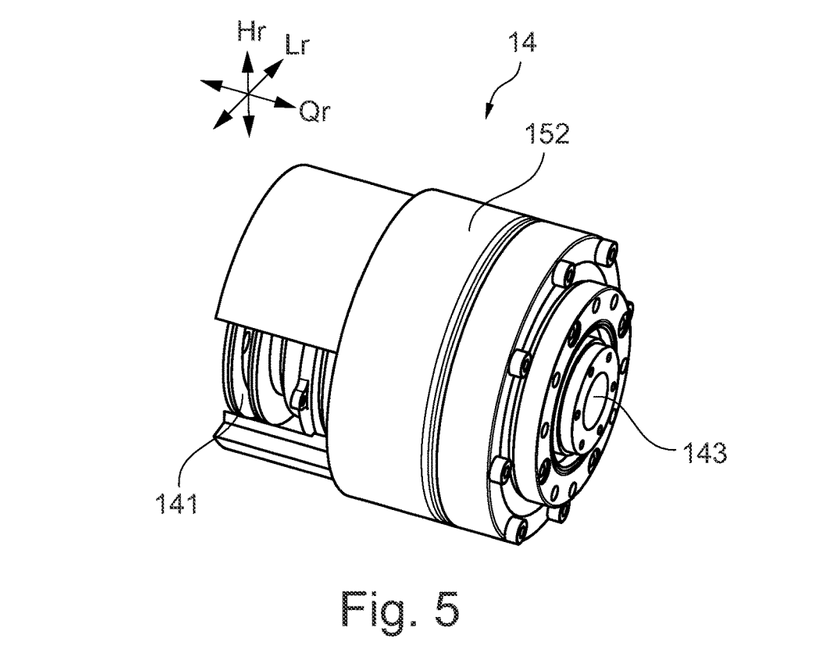
FIG. 5 shows a three-dimensional view of the drive device of FIG. 4.

As shown in FIG. 3 and in particular in the detailed views of FIG. 4 and FIG. 5, the drive device 14 of the linear axis 1 comprises an electric motor device 140 and a gear device 150, which are embodied as a drive cartridge. The drive device 14 thus forms a compact unit which may be easily and quickly set up in the linear axis 1 and removed again.

With the aid of the drive device 14, the toothed belt 15 and the carriage 11, which is mechanically fixed to it, may be driven by an electric motor and preferably with a reduction ratio. A single drive device 14 and a passive deflection gear for the toothed belt 15 or two drive devices 14, each with a drive gear for the toothed belt 15, may be used.

A principal embodiment of the drive device 14 comprises a radially outer gear output of the gear device 150, on which the drive gear 153 of the drive device 14 for the toothed belt 15 is seated.

Between the electric motor device 140 and the gear device 150 of the drive device 14 a shaft arrangement of the drive device 14 is preferably arranged. The shaft arrangement has a hollow shaft 142 which rotates comparatively quickly with respect to an output side 152 of the gear device 150. In the hollow shaft 142, a bearing shaft is arranged in a torque-proof manner with respect to the housing 20 of the linear axis 1. In this case, the hollow shaft 142 is preferably mounted on the torque-proof bearing axis 143 in a rotationally sliding manner. At least one radial rolling bearing, i.e. a roller bearing, ball bearing, needle bearing, etc., may additionally be used.

An input side 151 of the gear device 150 is connected to the hollow shaft 142 in a torque-proof manner, whereby the input side 151 is supported on the hollow shaft 142. An intermediate ring of the gear device 150 may be supported remote from the electric motor device 140 laterally at the actual gear device 150 via a radial rolling bearing on the torque-proof bearing shaft 143. Here, a separate ring may be provided for radially inner support. In a tension shaft transmission, such an intermediate is e.g. a deformable cylindrical bush or a so-called flexspline. In a cycloidal gear device, this is e.g. a cycloidal disk.

On the one hand, an output side 152 of the gear device 150 may be supported between the electric motor device 140 and the gear device 150, e.g. via a radial rolling bearing on the hollow shaft 142. Furthermore, on the other hand, the output side 152 may in turn be supported via a radial rolling bearing beyond the electric motor device 140 on the hollow shaft 142 or possibly also on the bearing axis 143. All radial rolling bearings may be embodied as roller bearings, ball bearings, needle bearings, etc. As the case may be, a radial plain bearing may also be used instead of a radial rolling bearing.

The electric motor device 140 drives the fast hollow shaft 142 as an input shaft of the gear device 150 with its output speed, which preferably reduces its input speed to an output speed of the gear device 150 or of the drive device 14. The output side 152 of the gear device 150 is connected to the drive gear 153 in a torque-proof manner. Here, the drive gear 153 is seated radially outwardly on the output side 152 of the gear device 150. Preferably, the output side 152 of the gear device 150 and the drive gear 153 are mutually configured in such a way that the drive gear 153 may preferably be easily disassembled from the output side 152 and reassembled.

Furthermore, the drive device 14 comprises an encoder 141, preferably embodied as a rotary encoder, on the torque-proof bearing axis 143.

Two possible embodiments of the multifunctional interface 120 of the carriage 11 with the connection side 114 are shown in FIG. 6 and FIG. 7. The embodiment of the multifunctional interface 120 of the carriage 11 shown in FIG. 6 corresponds to the embodiment also shown in FIG. 3. The two embodiments of the multifunctional interface 120 have a complementary structure and may be coupled to each other.

In both embodiments, the multifunctional interface 120 of the carriage 11 comprises a mechanical interface. In addition, the multifunctional interface may comprise a data signal interface, an electrical interface, and a fluidic interface. Here, the respective mechanical interface preferably delimits the other interfaces, which are thus set up radially within the mechanical interface in the multifunctional interface 120.

In the first embodiment shown in FIG. 6, the connection side 114 of the carriage 11 has a circular embodiment. On the circumferential side, the connection side 114 comprises a fastening ring 132 with an internal thread. The connection side 114 further comprises a face gearing 133 comprising four teeth, which is embodied as Hirth toothing. A centering receptacle 137 is also provided on the connection side 114. The fastening ring 132 with the internal thread and the face gearing 133 form the mechanical interface.

The connection side 114 further comprises a contact device, which in the first embodiment comprises a data signal interface device 134, an electrical interface device 135 and a fluidic interface device 136. The contact device is thereby adapted to the type and number of media supplied to the connection side 114.

The data signal interface device 134 is provided on a central axis Ra of the connection side 114. The electrical interface device 135 is provided radially outwardly of the data signal interface device 134 on the connection side 114. The fluidic interface device 136 is in turn provided radially outwardly of the electrical interface device 134 on the connection side 114.

The data signal interface device 134 is configured as an optical or electrical connector. The electrical interface device 135 comprises four electrical connectors arranged on a first inner circumference. The fluidic interface device 136 consists of four fluid connectors arranged on a second outer circumference.

The second embodiment of the connection side 114 shown in FIG. 7 extends perpendicularly to the axis of rotation Ra and is circular in shape. An external thread 232 is provided on an outer peripheral side of the connection side 114. The connection side 114 has a face gearing having six teeth, which is embodied as a Hirth toothing. A centering pin 237 is also provided on the connection side 114. The external thread 232 and the face gearing 233 form mechanical connecting elements.

The connection side 114 further comprises a contacting device, which in the second embodiment comprises a data signal interface device 234, an electrical interface device 235, and a fluidic interface device 236. The contacting device is thereby adapted to the type and number of media supplied to the connection side 114.

The data signal interface device 234 is provided on a central axis Ra of the connection side 114. The electrical interface device 235 is provided radially outwardly of the data signal interface device 234 on the connection side 114. The fluidic interface device 236 is again provided radially outwardly of the electrical interface device 234 on the connection side 114.

The data signal interface device 234 is embodied as a receptacle for an optical connector. The electrical interface device 235 comprises four receptacles for electrical connectors arranged on a first inner circumference. The fluidic interface device 236 comprises four receptacles for fluidic connectors arranged on a second outer circumference.

Figure 8:
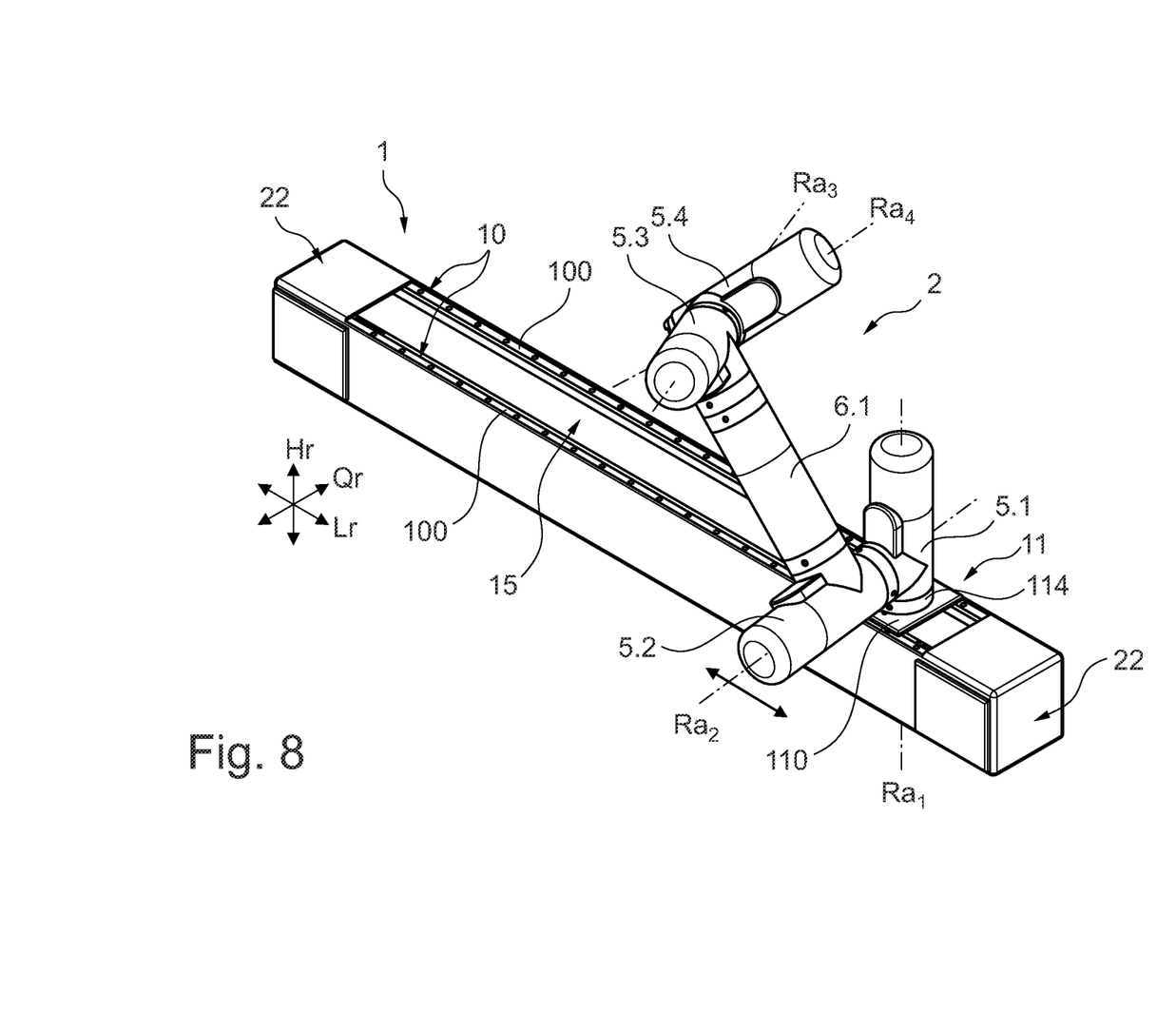
FIG. 8 shows a three-dimensional side view of an embodiment of a modular industrial robot with a driven linear axis according to FIGS. 1 to 3.

When assembling the multifunctional interface 120 of the carriage 11 with a pickup device, e.g. a robot arm, as shown in FIG. 8, the connection sides are of complementary with regard to one another and may be coupled to one another. The embodiment of the multifunctional interface 120 of the carriage 11 with the connection side 114 may thereby e.g. correspond to the embodiment shown in FIG. 6. The connection side of the pickup device is then embodied according to the embodiment shown in FIG. 7.

The following describes how to connect the complementary connection sides shown in FIG. 6 and FIG. 7.

The connection side 114 according to the embodiment of FIG. 7 is placed on the connection side 114 according to the embodiment in FIG. 6. In the process, the centering pin 237 engages in the centering receptacle 137. The centering pin 237 and the centering receptacle 137 thus serve as an encoding device. However, a different type of encoding could also be provided. For example, encoding could take place via a complementary geometry of the connection sides. Furthermore, the engagement of the centering pin 237 in the centering receptacle 137 provides an equipotential bonding between the two elements to be connected before the contact devices of the two connection sides touch one another, in particular before the contact devices for transmitting data signals and electric current or voltage touch one another.

By turning the fastening ring 132, the internal thread is screwed onto the external thread 232, pressing the connection sides onto each other as shown in FIG. 6 and FIG. 7. In the pressed-on state, the two face gearings 133, 233 engage with each other in such a way that the connection sides are mechanically connected to each other in a torque-locking manner. Furthermore, the contact devices of the two connection sides contact one another so that an optical, electrical and fluidic coupling is provided for transmitting data signals, electrical current or electrical voltage and fluid. The optical coupling takes place on the central axis, in particular the axis of rotation, of the mechanical connection. The electrical coupling and the fluidic coupling are provided radially outside of the optical coupling.

The optical coupling is performed by transmission between the two data signal interface devices 134, 234, which may be plugged into each other. Preferably, the data signal interface devices are embodied as simple opto- or electromechanical contact connection devices or plug-in connection devices.

The electrical coupling is achieved by transmission between the two electrical interface devices 135, 235, which may be plugged into each other. Preferably, the electrical interface devices are embodied as simple electromechanical contact connection devices or plug-in connection devices.

The fluidic coupling is achieved by transmission between the two fluidic interface devices 136, 236, which may be plugged into each other. Preferably, the fluidic interface devices are embodied as simple fluid-mechanical contact connection devices or plug-in connection devices.

FIG. 8 shows an example of an industrial robot. An industrial robot is an automatic machine for automation technology having several degrees of freedom, which may perform various functions in a work environment in (conditional) autonomous performance via a pre-programmed control system.

The industrial robot comprises a robot base, which is formed by the driven linear axis 1, the robot arm 2 and a preferably exchangeable end effector. The end effector is e.g. provided with a tool, a gripper, etc., which is arranged at a free or distal end of the robot arm 2.

The robot arm 2 of the industrial robot has a modular design with a plurality of arm modules. In principle, the arm modules may be embodied as desired, wherein a distinction may be made between active arm modules 5 and passive arm modules 6. An active arm module 5 comprises a drive device via which a further arm module which may be connected to it may be rotated. Similarly, a passive arm module 6 has no drive device and serves as an extension part.

The arm modules each have two connection sides, with the active arm modules 5 being L-shaped and the passive arm modules 6 being I-shaped. However, the arm modules may also comprise other geometric shapes.

The connection sides of the arm modules are embodied to be corresponding, complementary or analogous. A connection side of an arm module may be mechanically, optically, electrically and fluidically coupled with a corresponding connection side of another arm module. Preferably, the connection sides of the arm modules each have a uniform, complementary contacting mimic that ensures compatibility of the arm modules. Preferably, the arm modules each have a connection side in the embodiment shown in FIG. 6 and a connection side in the embodiment shown in FIG. 7.

The robot arm 2 in FIG. 8 comprises four active arm modules 5 and one passive arm module 6. However, the robot arm may consist of any number of active and passive arm modules. In FIG. 8, the active arm modules 5 and the passive arm modules 6 are each given an additional number separated by a dot to distinguish them, and are numbered starting from the robot base toward the distal end.

In the robot arm 2 in the embodiment of FIG. 8, a first active arm module 5.1 is connected to the carriage 11 of the driven linear axis 1 as the robot base. A second active arm module 5.2 is connected to the first active arm module 5.1. A passive arm module 6.1 is arranged between the second active arm module 5.2 and a third active arm module 5.3. A fourth active arm module 5.4 is connected to the third active arm module 5.3 and forms the distal end of the robot arm 2.

Each active arm module 5 forms an axis of movement. The robot arm 2 of FIG. 8 thus comprises four axes of movement which are formed as rotational axes $Ra_n$ (n=1, ... 4). Any number of complete and partial rotations of the respective active arm module 5 may be performed in preferably both circumferential directions Ur of a respective rotation axis $Ra_n$ (n=1, ... 4). The rotational axes $Ra_n$ (n=1, ... 4) are preferably the ideal "joints" (rotational joint, rotary joint and/or swivel joint) of the robot arm 2, e.g. with respect to the driven linear axis 1. In principle, the robot arm may comprise between two and six axes of movement, which are provided by a corresponding number of active arm modules.

In the active arm modules 5, the connection sides are embodied to be controllably rotatable relative to one another. Furthermore, an optical rotation transfer device for a rotational transmission of data signals between the connection sides, an electrical rotation transfer device for a rotational transmission of electrical energy between the connection sides and a fluidic rotation transfer device for a rotational transmission of fluid between the connection sides are provided.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

TABLE 1

| List of reference numerals: 1-237 | |
| --- | --- |
| 1 | Driven linear access |
| 2 | Robot arm |
| 5 | Arm module |
| 10 | Linear rail guide |
| 11 | Carriage |
| 14 | Drive device |
| 15 | Toothed belt |
| 16 | Drag chain |
| 17 | Plate-shaped device |
| 20 | Housing |
| 22 | Drive housing section |
| 100 | Profile rail |
| 110 | Guide body (carriage) |
| 112 | Track carriage (carriage) |
| 114 | Connection side (carriage) |
| 120 | Multifunctional interface (carriage) |
| 132 | Fastening ring |
| 133 | Face gearing |
| 134 | Optical interface device |
| 135 | Electrical interface device |

TABLE 1-continued

List of reference numerals: 1-237

| | |
|---|---|
| 136 | Fluidic interface device |
| 137 | Centering receptacle |
| 140 | Electric motor device |
| 141 | Encoder |
| 142 | Hollow shaft |
| 143 | Bearing axis |
| 150 | Gear device |
| 151 | Input side (gear device) |
| 152 | Output side (gear device) |
| 153 | Drive gear |
| 154 | Running gear |
| 232 | External thread |
| 233 | Face gearing |
| 234 | Optical interface device |
| 235 | Electrical interface device |
| 236 | Fluidic interface device |
| 237 | Centering pin |

The invention claimed is:

1. A driven linear axis comprising:
a housing having a linear rail guide with two profile rails on which a carriage is arranged so as to be linearly movable back and forth with the aid of a transport device;
wherein the carriage has a guide body with two lateral track carriages and a multifunctional interface,
wherein the carriage is guided between the two profile rails with the aid of the two lateral track carriages,
wherein the transport device comprises a belt which circulates in the housing and is guided over two gears, at least one gear being configured as a drive gear,
wherein a drive device is set in the drive gear and configured in the form of a modular drive cartridge engaged in a torque-locking rotational connection with the drive gear,
wherein the drive device has an electric motor device and a gear device;
wherein a shaft arrangement with a hollow shaft as an output shaft is provided between the electric motor device and the gear device, said shaft arrangement being rotatably received on a bearing axis of the drive device, said bearing axis being torque-proof with respect to the housing,
wherein an input side of the gear device is connected to the hollow shaft in a torque-proof manner, and
wherein the drive gear is seated radially outwardly on an output side of the gear device and is coupled to the output side of the gear device in a torque-proof manner.

2. The driven linear axis according to claim 1,
wherein the multifunctional interface comprises a connection side comprising a mechanical interface and a media interface, and
wherein at least one reciprocable media drag device provides a media path to the media interface within the housing.

3. The driven linear axis according to claim 2, wherein at least one drag chain of the reciprocable media drag device is arranged between upper and lower layers of the belt in the housing and rests on a plate-shaped device which is fixed laterally on an inside of the housing.

4. The driven linear axis according to claim 2,
wherein the media interface comprises a data signal interface, an electrical interface and a fluidic interface, and
wherein the at least one reciprocable media drag device provides a data signal path to the data signal interface, an electrical path to the electrical interface and a fluid path to the fluidic interface of the multifunctional interface.

5. The driven linear axis according to claim 4,
wherein the data signal interface, the electrical interface and the fluidic interface are provided radially inside the mechanical interface,
wherein the data signal interface is provided on a central axis of the mechanical interface, and
wherein the electrical interface and the fluidic interface are provided radially outside the data signal interface.

6. The driven linear axis according to claim 2, wherein the connection side of the multifunctional interface is configured as a connection socket for a connection disk or as a connection disk for a connection socket.

7. An industrial robot having:
a robot arm, and
a robot base, the robot base comprising a housing having a linear rail guide with two profile rails on which a carriage is arranged so as to be linearly movable back and forth with the aid of a transport device;
wherein the carriage has a guide body with two lateral track carriages and a multifunctional interface,
wherein the carriage is guided between the two profile rails with the aid of the two lateral track carriages,
wherein the multifunctional interface comprises a connection side comprising a mechanical interface and a media interface,
wherein at least one reciprocable media drag device provides a media path to the media interface within the housing,
wherein a connection side of the robot arm is constructed complementary to the connection side of the multifunctional interface, wherein the robot arm is mechanically connected to the carriage of the driven linear axis and is signal-wise, electrically and/or fluidically connected to the carriage of the driven linear axis;
wherein the transport device comprises a belt to which the carriage is mechanically fixed, the belt being circulating in a housing and being guided over two gears, at least one gear being configured as a drive gear, and
wherein the transport device further comprises a modular drive cartridge, the modular drive cartridge comprising an electric motor device and a gear device and being placed inside the gear device.

8. The industrial robot according to claim 7,
wherein the robot arm comprises a plurality of arm modules, and
wherein at least one of the plurality of arm modules is configured as an active arm module a further drive device via which a further arm module connected thereto is rotatable.

9. The industrial robot according to claim 7,
wherein the transport device comprises a belt which circulates in the housing and is guided over two gears, at least one gear being configured as a drive gear, and
wherein a drive device is set in the drive gear and configured in the form of a modular drive cartridge engaged in a torque-locking rotational connection with the drive gear.

10. The industrial robot according to claim 9,
wherein the drive device has an electric motor device and a gear device,
wherein a shaft arrangement with a hollow shaft as an output shaft is provided between the electric motor device and the gear device, said shaft arrangement being rotatably received on a bearing axis of the drive device, said bearing axis being torque-proof with respect to the housing, wherein an input side of the gear device is connected to the hollow shaft in a torque-proof manner, and wherein the drive gear is seated radially outwardly on an output side of the gear device and is coupled to the output side of the gear device in a torque-proof manner.

11. The industrial robot according to claim 9, wherein at least one drag chain of the reciprocable media drag device is arranged between upper and lower layers of the belt in the housing and rests on a plate-shaped device which is fixed laterally on an inside of the housing.

12. The industrial robot according to claim 7, wherein the media interface comprises a data signal interface, an electrical interface and a fluidic interface, and wherein the at least one reciprocable media drag device provides a data signal path to the data signal interface, an electrical path to the electrical interface and a fluid path to the fluidic interface of the multifunctional interface.

13. The industrial robot according to claim 12, wherein the data signal interface, the electrical interface and the fluidic interface are provided radially inside the mechanical interface, wherein the data signal interface is provided on a central axis of the mechanical interface, and wherein the electrical interface and the fluidic interface are provided radially outside the data signal interface.

14. The industrial robot according to claim 7, wherein the connection side of the multifunctional interface is configured as a connection socket for a connection disk or as a connection disk for a connection socket.

\* \* \* \* \*